(12) United States Patent
Koch

(10) Patent No.: US 11,650,303 B2
(45) Date of Patent: May 16, 2023

(54) METHOD FOR OPERATING A RADAR SENSOR IN A MOTOR VEHICLE, RADAR SENSOR, AND MOTOR VEHICLE

(71) Applicant: Audi AG, Ingolstadt (DE)

(72) Inventor: Niels Koch, Reichertshofen (DE)

(73) Assignee: AUDI AG, Ingolstadt (DE)

( * ) Notice: Subject to any disclaimer, the term of this patent is extended or adjusted under 35 U.S.C. 154(b) by 427 days.

(21) Appl. No.: 16/604,075

(22) PCT Filed: Apr. 20, 2018

(86) PCT No.: PCT/EP2018/060133
§ 371 (c)(1),
(2) Date: Oct. 9, 2019

(87) PCT Pub. No.: WO2018/197346
PCT Pub. Date: Nov. 1, 2018

(65) Prior Publication Data
US 2020/0041637 A1 Feb. 6, 2020

(30) Foreign Application Priority Data
Apr. 25, 2017 (DE) .......................... 102017206944.9

(51) Int. Cl.
*G01S 13/34* (2006.01)
*G01S 7/35* (2006.01)
*G01S 13/931* (2020.01)

(52) U.S. Cl.
CPC ............ *G01S 13/347* (2013.01); *G01S 7/352* (2013.01); *G01S 13/931* (2013.01); *G01S 7/356* (2021.05)

(58) Field of Classification Search
CPC ...... G01S 13/347; G01S 7/352; G01S 13/931; G01S 7/356
See application file for complete search history.

(56) References Cited

U.S. PATENT DOCUMENTS 7,504,988 B2 * 3/2009 Tsuchihashi ............ G01S 13/87
342/158
8,902,103 B2 12/2014 Kim et al.
(Continued)

FOREIGN PATENT DOCUMENTS

CN 102680963 A 9/2012
CN 103576143 A 2/2014
(Continued)

OTHER PUBLICATIONS

Jri Lee, Member, IEEE, Yi-An Li, Meng-Hsiung Hung, and Shih-Jou Huang, A Fully-Integrated 77-GHz FMCW Radar Transceiver in 65-nm CMOS Technology 12, Dec. 2010 (Year: 2010).*
(Continued)

*Primary Examiner* — Peter M Bythrow
*Assistant Examiner* — Nazra Nur Waheed
(74) *Attorney, Agent, or Firm* — Sterne, Kessler, Goldstein & Fox P.L.L.C.

(57) ABSTRACT

A radar sensor in a motor vehicle has at least one antenna arrangement for emitting and receiving radar signals and a processing device for evaluating received radar signals. The antenna arrangement is controlled to simultaneously emit and receive radar signals both in a far frequency range and in a near frequency range, where the bandwidth of the near frequency range is greater than that of the far frequency range. The received radar signals of the near frequency range are evaluated as radar data of a higher distance resolution and received radar signals of the far frequency range are evaluated as radar data of a lower distance resolution.

18 Claims, 2 Drawing Sheets

(56) References Cited

U.S. PATENT DOCUMENTS

| | | | |
|---|---|---|---|
| 9,389,312 B2 | 7/2016 | Khlifi | |
| 2003/0164791 A1* | 9/2003 | Shinoda | H01Q 25/02 342/70 |
| 2003/0210174 A1 | 11/2003 | Nakamura | |
| 2008/0024353 A1* | 1/2008 | Schneider | G01S 13/931 342/70 |
| 2008/0084346 A1* | 4/2008 | Minichshofer | G01S 7/2813 342/385 |
| 2011/0267217 A1 | 11/2011 | Hildebrandt et al. | |
| 2011/0285573 A1* | 11/2011 | Jeong | G01S 13/931 342/146 |
| 2012/0188117 A1 | 7/2012 | Jeong | |
| 2012/0235857 A1* | 9/2012 | Kim | G01S 13/931 342/134 |
| 2012/0290169 A1 | 11/2012 | Zeng et al. | |
| 2015/0042507 A1 | 2/2015 | Jeong et al. | |
| 2016/0047908 A1* | 2/2016 | Wagner | G01S 13/0209 342/21 |
| 2018/0267165 A1 | 9/2018 | Steinbuch et al. | |
| 2019/0267703 A1 | 8/2019 | Koch | |

FOREIGN PATENT DOCUMENTS

| | | |
|---|---|---|
| DE | 10360890 A1 | 7/2005 |
| DE | 102004017720 A1 | 10/2005 |
| DE | 102004046634 A1 | 3/2006 |
| DE | 102006049879 A1 | 4/2008 |
| DE | 102007021730 A1 | 12/2008 |
| DE | 102012001069 A1 | 8/2012 |
| DE | 102012102769 A1 | 11/2012 |
| DE | 102015000426 A1 | 7/2016 |
| DE | 102016007434 A1 | 12/2017 |
| JP | 2006046962 A | 2/2006 |
| WO | WO 2017/054962 A1 | 4/2017 |

OTHER PUBLICATIONS

A Full-Integrated 77-GHz FMCW Radar Transceiver in 65-nm CMOS Technology. Jri Lee, 2010 (Year: 2010).*

A Fully-Integrated 77-GHz FMCW Radar Transceiver in 65-nm CMOS Technology. Jri Lee, (Year: 2010).*

International Search Report and Written Opinion of the International Searching Authority directed to related International Patent Application No. PCT/EP2018/060133, dated Jul. 25, 2018, with attached English-language translation; 13 pages.

International Preliminary Report on Patentability directed to related International Patent Application No. PCT/EP2018/060133, dated Aug. 16, 2019, with attached English-language translation; 13 pages.

* cited by examiner

METHOD FOR OPERATING A RADAR SENSOR IN A MOTOR VEHICLE, RADAR SENSOR, AND MOTOR VEHICLE

TECHNICAL FIELD

The invention relates to a method for operating a radar sensor in a motor vehicle, where the radar sensor has at least one antenna arrangement for emitting and receiving radar signals and a processing device for evaluating received radar signals, a radar sensor and a motor vehicle.

BACKGROUND

Radar sensors play a major role in modern vehicles in terms of detection of the vehicle surroundings. A variety of proposed and actually implemented driver assistance systems and/or safety systems use radar sensors to obtain information about the surroundings of the motor vehicle. A prominent example of such driver assistance systems is the longitudinal guiding of at least partially automated longitudinal guidance systems, such as adaptive cruise control (ACC) systems. The basic principle of radar sensors is the emission of electromagnetic waves, the radar signals, which are reflected against an object and received back again. The received radar signals can then be evaluated in particular with respect to a distance of the object, a direction and a relative speed.

In the context of the evaluation of received radar signals, inter alia, a fast Fourier transformation takes place, which converts a received frequency spectrum back to run times and quickly increases in effort with respect to a temporal rasterization and thus the distance rasterization. However, the number of nodes that are used in the frequency range (frequency band) determines the distance resolution. With regard to the distance resolution and the range, different operating modes of radar sensors have already been proposed. When a radar sensor is used for the far range detection, a rather narrow frequency bandwidth of 250 MHz is usually used, for example, in the known 76 GHz radar sensors, which use chirps. If, for example, 512 interpolation points are used as part of the fast Fourier transform (FFT), a range of 84 m is covered, where each distance raster element is approximately 30 cm in size. This raster size is also called distance resolution. With a more accurate detection at a shorter range, e.g., in a near range operating mode of the radar sensor, a higher frequency bandwidth is used, for example, a frequency bandwidth that is twice as high, compared to the aforementioned example, thus 500 MHz. With the same number of FFT nodes, the grid size is reduced to 15 cm, so that the distance resolution is increased, but this is to the detriment of the now maximum evaluable range, because it is now only 42 m.

For very fine distance resolutions, as are to be used, for example, in parking operations or the like, thus raster sizes in the range of about 3-5 cm, the maximum evaluable distance is only 10-15 m with the same number of FFT support points. Such a mode of operation of a radar sensor may also be referred to as a parking mode of operation.

While a parking mode of operation of a radar sensor is expediently activated only for parking operations, the decision for a mode of operation is more difficult with respect to the near range operating mode ("short look") and the far range operating mode ("long look"). On the one hand, approaching objects, that is, those with high ranges, are to be detected early; on the other hand, closer objects, in particular traffic participants, are significantly closer to the motor vehicle and extremely relevant for the operation of their own motor vehicle, so that it is desirable for them to be acquired and tracked with sufficiently high distance resolution (tracking).

Therefore, it has already been proposed for radar sensors in motor vehicles to perform a regular switching between the two operating modes, e.g., the near range operating mode and the far range operating mode ("interleaving"). For example, it is possible to switch between the far range operating mode and the near range operating mode in the ratio 1:1 or 1:2, where the ratio can be selected as a function of the speed of the motor vehicle, for example. However, if the radar sensor is in the near range operating mode, then a large coverage area is not covered by the detection; rather, detection only takes place at least one cycle later, so that for a typical duration of a time window of 40 ms 50 ms, defined as the refresh rate, only approximately every 100 ms in the far coverage area is detected. Very fast approaching motor vehicles or other objects are thus recognized very late, which is undesirable.

DE 10 2006 049 879 A1 relates to a radar system for motor vehicles, where a plurality of radar sensors is to be used for monitoring the area in front of the vehicle, of which at least two should be LRR sensors, that is, long range radar sensors. In one embodiment, it is proposed to operate the sensors alternately using different frequency modulations, where in each cycle the modulation of one sensor should be optimized for the near range, while in the other sensor it is optimized for the far range. In this way, a signal with good distance resolution is obtained both for the left and for the right sensor in every second cycle, while at the same time, by fusion of the data of the two sensors, an optimal far range detection in each cycle should be possible.

In this case, two radar sensors are therefore required, each of which emits with a time delay, resulting in an increase in effort and processing time.

BRIEF DESCRIPTION OF THE DRAWINGS/FIGURES

DETAILED DESCRIPTION

Figure 1:
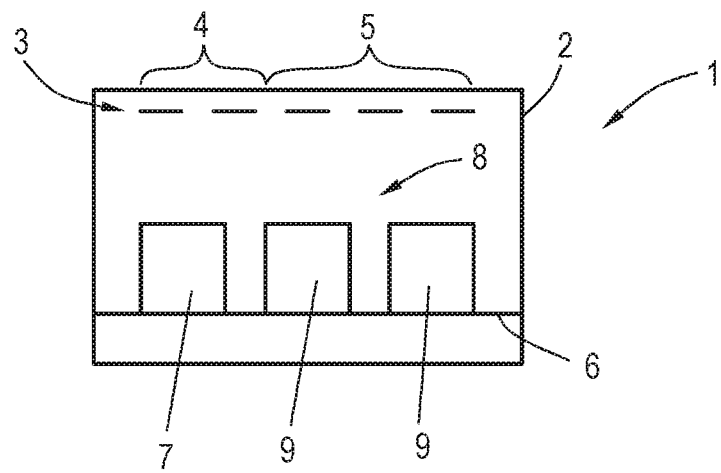
FIG. 1 illustrates a schematic diagram of a radar sensor, according to some embodiments of this disclosure.

The invention is therefore based on the object of reducing the latency time until near range and far range data are present in a manner involving as little effort as possible.

To achieve this object, the invention provides in a method of the type mentioned at the outset that the antenna arrangement for simultaneous transmission and reception of radar signals is controlled both in a far frequency range and in a near frequency range, where the bandwidth of the near frequency range is greater than that of the far frequency range, where received radar signals of the near frequency range are evaluated as radar data of a higher distance resolution and received radar signals of the far frequency range are evaluated as radar data of a low distance resolution.

The invention is based on the idea of no longer separating a near range operating mode and a far range operating mode by using different time windows, but to carry out the measurement at the same time, that is, at least within a common transmission time window and reception time window, by virtue of a frequency range separation taking place. In other words, radar signals are emitted simultaneously in a common transmission time window in both the far frequency range and the near frequency range. During a subsequent reception time window, the reflected radar signals of both frequency ranges are also received at the same time. This temporal parallelization and at the same time isolation of the radar signals via the frequency enables latency-reduced detection in both coverage areas and in both distance resolutions.

The operating modes that were previously performed in an interleaved manner are now carried out at the same time, so that the distance and the proximity are detected at the same time, where in the case of overlapping detection ranges the near range is detected redundantly, namely once with the coarse rasterization of the lower distance resolution ("long look") and once with the finer rasterization via the higher distance resolution ("short look"). While detected objects could move at a time separation of these detection processes, and thus this movement could be detected only roughly and with twice the duration, the invention thus makes it possible to detect movements more continuously and with finer resolution.

Overall, there is thus the simultaneous detection of the entire coverage area in both distance resolutions, where the latency is reduced and, with simultaneous evaluation as will be discussed in more detail below, can even be completely eliminated. However, even with sequential evaluation in the two frequency ranges, a reduction of the latency is possible, where investigations have shown that the reduction here is in the range from 60 to 75%. The reduced latency yields advantages, in particular when tracking objects, after there is no longer any jump in the scanning times, thereby increasing the stability of Kalman filters in the case of tracking algorithms. Objects can therefore be better tracked.

It can be provided that in the evaluation of the received radar signals of both frequency ranges the same number of nodes in a fast Fourier transform is used and/or the bandwidth of the near frequency range is at least twice the bandwidth of the far frequency range. For example, 512 nodes can be set; as bandwidths, 500 MHz is provided for the near frequency range and 250 MHz, respectively, for the far frequency range.

In a particularly preferred embodiment of the present invention, it can be provided that, in an at least partially overlapping spatial detection range for the frequency ranges, a common evaluation is carried out of received radar signals for an overall frequency range that fully encompasses the near frequency range and the far frequency range and is continuous. The overall frequency range thus begins with the lowest edge frequency of the two frequency ranges and ends with the highest edge frequency of the two frequency ranges. In this way, a surprising side effect of this methodology is used, which increases the object detection accuracy in the near field. Not only the detection of an object with different resolution rasterizations contributes to the detection improvement, for example by mutual plausibility checking, but an object in the vicinity is also scanned with an even higher bandwidth if the detection ranges overlap appropriately and the far frequency range is not completely within the near frequency range.

In the latter special case, it may be provided in an expedient further development that, in the case where a spatial detection range of the far frequency range is completely contained, at least with respect to the opening angle, within the spatial detection range of the near frequency range, the far frequency range is completely encompassed by the near frequency range that forms the overall frequency range. In this embodiment, the overall frequency range is therefore the near frequency range, so that the evaluation in the overall frequency range corresponds to the evaluation in the near frequency range. In this way, advantageously only one bandwidth of the emitted signals is required, which is sufficient for the satisfactory distance resolution in the near range, so that in this regard no modifications need be made. The far frequency range is simply cut out with respect to the received signals from the near frequency range and fed to the corresponding evaluation.

Alternatively, however, the overall frequency range is greater than the near frequency range, where preferably the near frequency range and the far frequency range are separated, apart from possibly a touch frequency, are separated, and thus disjointed, so that the overall frequency range is additionally produced with frequency ranges in immediate succession. Therefore, if one sets the frequency separation so that, for example, the far frequency range ends where the near frequency range begins, a total detection bandwidth of 750 MHz is produced from a 500 MHz detection bandwidth of the near frequency range and a 250 MHz detection bandwidth of the far frequency range. With the same number of FFT support points, for example 512 support points, it would thus be possible to significantly reduce the distance raster to, for example, less than 3 cm, as far as the evaluation of the overall frequency range is concerned.

An advantageous development in this connection provides that, in the case of an output frequency range not covered by radar signals between the near frequency range and the far frequency range, signal levels there for the evaluation are set to zero or an interpolation takes place in the output frequency range. If a certain frequency range is omitted, in this case the output frequency range, an evaluation in the overall frequency range is nevertheless possible which concerns the bandwidth of the overall frequency range and thus enables outstanding distance resolutions in an ultra-near range. If the output frequency range in the above example has a frequency bandwidth of 250 MHz, a frequency bandwidth of the overall frequency range of 1000 MHz=1 GHz results, where advantageously the entire frequency bandwidth of the overall frequency range does not also have to be covered. This is because the signal levels in the output frequency range can easily be set to zero, as would ultimately also be the case if in this range an attenuation would occur, or there can be an interpolation between the near frequency range and the far frequency range. Thus, it is conceivable, for example, to increase the resolution for the overall frequency range by starting the far frequency range at the lowest end of the overall frequency range and ending the near frequency range at the uppermost end of the overall frequency range, where in the output range there is an interpolation or a setting to zero. The possibility to close the bandwidth gap already arises from the fact that most of the objects that occur in practice move and behave in a linear fashion, resulting overall in a quasi-resolution improvement in the ultra-near range without having to limit the ranges in the process.

An expedient embodiment of the invention can provide that the radar signals of the near frequency range and the radar signals of the far frequency range are emitted in different directions. Thus, detection is possible, for example, by means of a single radar sensor toward the front and to the side or even on opposite sides, in accordance with existing antenna arrangements, without having to contend with excessive latency losses. It is thus possible to scan different directions with the radar sensor without building up latency. For example, radar sensors have already been proposed which transmit in a far range operating mode in a longitudinal direction of the motor vehicle and measure in a near range operating mode in a manner aligned with an expanded viewing range to the side of the motor vehicle. While at this point such prior art radar sensors have been used for detection in the longitudinal direction of the motor vehicle in the far range operating mode, no objects could be detected on the side and vice versa. If an alternate operation was applied in the two modes of operation, despite the refresh rate of 50 ms, a refresh rate of 100 ms was effectively present for the far range and near range. If a parallelization of the emission and also of the reception of the radar signals for a plurality of directions is then allowed according to the invention, where it becomes easy to make a distinction with frequency decoupling, there is also a clear latency reduction for such cases and current measurement data are more frequently available.

As already explained, it is basically conceivable to evaluate the received radar signals of the near frequency range and the far frequency range sequentially, in particular using the same evaluation/processing unit. Then, although there is an increased processing time, in practice there is nevertheless a latency reduction, for example, as already mentioned above, in the range of 60 to 75%.

Nevertheless, a preferred embodiment of the present invention provides that the evaluation of the received radar signals in the far frequency range and in the near frequency range takes place parallel in time. Then, optimal operation of the radar sensor can be realized by the last received radar signals during a current transmission and measurement phase always being evaluated. For example, an emission and reception block having a duration of 50 ms can be executed in parallel to a 50 ms evaluation block for the last received radar signals, so that new, current radar data are determined by evaluation every 50 ms. It is particularly preferred in this context if a radar sensor having at least two processing units, in particular digital signal processors each assigned to a frequency range, is provided for the processing device. Processing units, in particular in the case of multi-core processors, can be abstractly defined for example as a plurality of cores of such a multi-core processor; however, the radar sensor can preferably be provided, for example, with another digital signal processor (DSP) in order to evaluate on independent processors the received radar signals for the different frequency ranges, that is, at least the near frequency range and the far frequency range. In exemplary embodiments, it may also be conceivable additionally to provide a processing unit for an evaluation in the overall frequency range, if it does not already correspond to the near frequency range. By using separate processing units, the "short look" and the "long look" can be processed in parallel without latency. The evaluation results of both operating modes used at the same time are also available for further processing at the same time.

In particular, it is possible to carry out a latency-free fusion of the evaluation results for the near frequency range and the far frequency range in a parallel evaluation, in particular to improve object probabilities by mutual plausibility checking and/or to carry out tracking based on the respective results. In the tracking of the objects, there is no jump in the scanning times, which is conducive to the reliable functioning of Kalman filters.

In an alternative embodiment, it is conceivable, even if also less preferred, that the evaluation for the frequency ranges takes place sequentially, where the received radar signals of the frequency range to be evaluated later are retained until the beginning of the evaluation by delaying the signal processing, in particular in an analog-to-digital converter. Therefore, if at least one second processing unit is not to be used, the received radar signals of the far frequency range can first be evaluated, for example, where the evaluation results can be temporarily stored in order then to carry out the evaluation in the other frequency range, in the example in the near frequency range. For this purpose, it is expedient to delay the signal processing in the analog-to-digital converter (A/D converter). The processing speed of digital signal processors (DSP), especially if implemented in special ASICs, is very high, so that the resulting delay in sequential processing and thus the remaining latency is only a few milliseconds. Also in the sequential evaluation, it is of course possible to supply the evaluation results to a common further processing or evaluation, for example to obtain an object confirmation by comparing the respective evaluation results and/or to improve the tracking of objects. In the embodiment thus described, the latency is not completely eliminated, but significantly reduced, where it is, however, possible to eliminate having to use a processing unit such as a digital signal processor.

Preferably, an antenna arrangement having one subantenna arrangement each for the near frequency range and for the far frequency range and/or at least one antenna arrangement designed as a horn radiator may be used as the antenna arrangement. Depending on whether, for example, an expanded bandwidth for the antenna arrangement is required for a certain desired overall frequency range, and thus how much the distance resolution is to be improved, it may be provided to modify antenna arrangements of existing radar sensors. Known in the prior art, for example, are so-called patch antenna columns, which have a usable bandwidth from about 700 MHz to a maximum of 1000 MHz. In general, however, the principle applies here that the smaller the relative bandwidth, in the example about 1%, the higher the quality of the antenna arrangement, so that, conversely, when the relative bandwidth is greater, the quality of the antenna arrangement decreases.

If the antenna arrangements are to be designed with broadband, the quality decreases in order to obtain more usable bandwidth for good frequency separation. An alternative embodiment of the present invention, however, provides for maintaining separate sub antenna arrangements for the near frequency range and the far frequency range since they can be implemented on a narrow-band basis with a high quality. However, when subantenna arrays are used, radar sensors may need to be made larger and more complex, so that in other cases a single antenna arrangement for the near frequency range and the far frequency range may be useful.

Overall, it makes sense to use a horn antenna structure, thus employing an antenna designed as a horn radiator in the antenna arrangement. A horn radiator antenna is characterized in its construction in that it comprises a metal surface approximating the shape of an exponential funnel, which can be fed via a waveguide. Such a horn radiator, which is also suitable in the context of the present invention, is disclosed, for example, in the post-published patent application DE 10 2016 007 434.5. The horn radiator described there has a large usable frequency bandwidth of up to 30 GHz. As an alternative to an antenna designed as a horn radiator, slot-coupled patch antennas may also be used in order to improve the frequency bandwidth of the antenna arrangement. Of course, other solution approaches known in principle in the prior art can also be used.

In a further development of the present invention, it can be provided that at least two transmission channels of the antenna arrangement are used, where different transmission channels are used for emitting the radar signals of different frequency ranges. For example, today's highly integrated radar sensors are known which provide three separate transmission channels and four independent reception channels. If a broadband antenna structure as just described, for example, at the four receiving channels, a total allowable radar band of, for example, 76 to 81 GHz can be detected. However, the invention also makes it possible to assign transmission channels to the near frequency range and the far frequency range, respectively. Thus, for example, it may be provided to use a transmission channel to a high-quality antenna for the near frequency range, while two further transmission channels are connected in parallel to at least one further high-quality antenna, so that the radar signals of the far frequency range can thus be emitted. By using a larger number of transmission channels for the far frequency range, a higher power is provided, resulting in a large distance bridging and thus a long range. In the case of using two transmission channels for the far frequency range and using one transmission channel for the near frequency range, a double transmission power can thus be achieved for the far frequency range. A subantenna arrangement for the far frequency range may further be configured to focus a high-intensity main beam direction on the area of interest in the distance, so that, for example, ranges of about 250 m can be easily achieved.

All in all, it may also be expedient if the radar signals of the far frequency range are emitted with a higher transmission power than the radar signals of the near frequency range, in particular by using a higher number of transmission channels, and/or that the radar signals of the far frequency range are emitted in a focused manner, in particular by means of an assigned subantenna arrangement. Corresponding transmission techniques are already known in the art and need not be described in more detail here, in particular also with regard to the beam optics.

As already indicated, a particularly preferred embodiment of the invention provides that the evaluation results for the near frequency range and the far frequency range are further jointly evaluated in at least partially overlapping spatial detection ranges, in particular for determining object probabilities and/or for tracking at least one detected object described by the evaluation results. At least in the overlapping coverage area and opening angle range, a mutual plausibility checking of detected objects and thus an object confirmation is therefore possible; advantages of the tracking have already been described, for example with regard to Kalman filters.

In addition to the method, the invention also relates to a radar sensor for a motor vehicle comprising at least one antenna arrangement for emitting and receiving radar signals, a processing device for evaluating received radar signals and a control device which is designed to carry out the method according to the invention. All statements relating to the method according to the invention can be analogously applied to the radar sensor according to the invention with which the already mentioned advantages can thus be obtained.

Finally, the invention also relates to a motor vehicle which has a radar sensor according to the invention.

Figure 2:
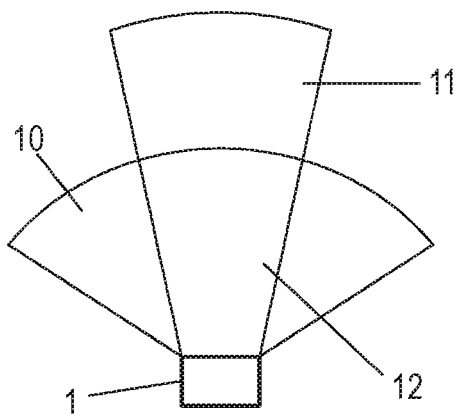
FIG. 2 illustrates a schematic representation of detection ranges with the radar sensor of FIG. 1, according to some embodiments of this disclosure.
Figure 3:
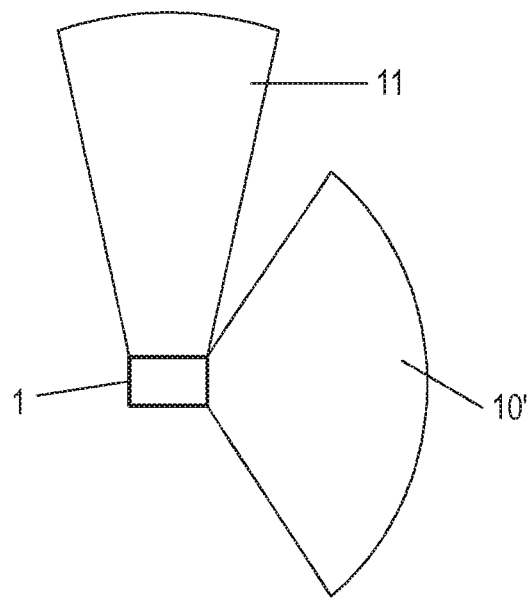
FIG. 3 illustrates a schematic representation of detection ranges in an alternative embodiment with radiation in different directions, according to some embodiments of this disclosure.
Figure 4:
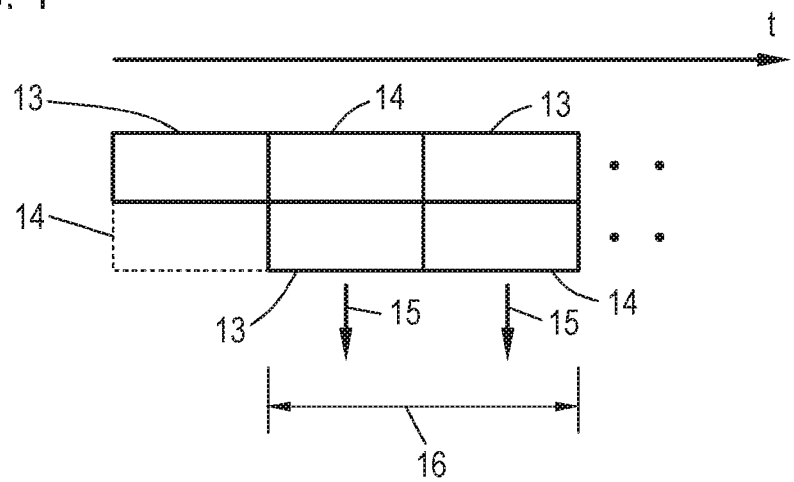
FIG. 4 illustrates a schematic representation of temporal sequences in a radar sensor, according to some embodiments of this disclosure.
Figure 5:
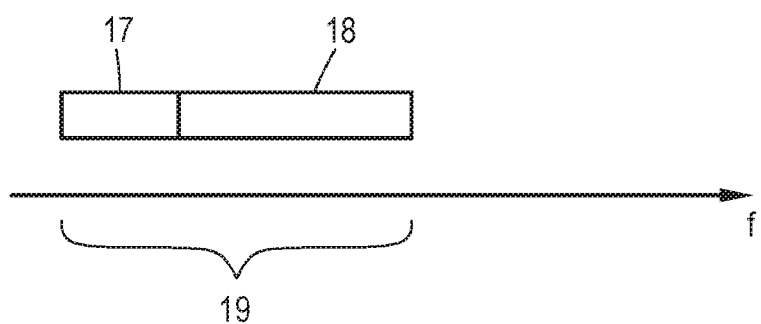
FIG. 5 illustrates a schematic representation of the position of frequency bands, according to some embodiments of this disclosure.
Figure 6:
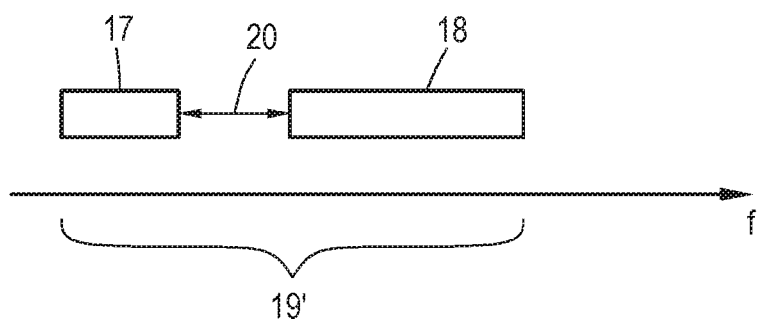
FIG. 6 illustrates another schematic representation of the position of frequency bands, according to some embodiments of this disclosure.
Figure 7:
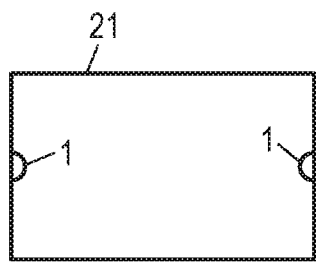
FIG. 7 illustrates a schematic representation of a motor vehicle according to some embodiments of this disclosure.

Further advantages and details of the present invention will become apparent from the embodiments described below and with reference to the drawings, in which:

FIG. 1 shows a schematic diagram of a radar sensor according to the invention, FIG. 2 shows detection ranges with the radar sensor of FIG. 1, FIG. 3 shows detection ranges in an alternative embodiment with radiation in different directions, FIG. 4 shows temporal sequences in a radar sensor according to the invention, FIG. 5 shows a first embodiment of the position of frequency bands, FIG. 6 shows a second embodiment of the position of frequency bands, and FIG. 7 shows a motor vehicle according to the invention.

FIG. 1 is a schematic diagram of a radar sensor 1 according to the invention. The radar sensor 1 initially has an antenna arrangement 3 arranged in a housing 2 that can optionally be subdivided into subantenna arrays 4, 5, for example by means of a control via different transmission channels. Formed as chips on a printed circuit board 6, the radar sensor 1 further comprises a control unit as a control device 7 which is designed to carry out the method according to the invention and at least two digital signal processors 9 (DSP) as a processing device 8.

The antenna arrangement 3 can have a plurality of antennas designed as slotted patch antennas or horn radiators. In the present case, the subantenna arrangement 4 is controlled via a first of three transmission channels, the subantenna arrangement 5 via two of the transmission channels. The subantenna arrangements 4, 5 are designed to realize various detection ranges 10, 11, which are shown in greater detail in FIG. 2. By means of the first subantenna arrangement 4, a near detection range 10 can be scanned, the opening angle of which is greater than that of the far detection range 11. Since only one transmission channel is used, however, the transmission power is lower, which also shows in a smaller range. Due to the double transmission power, a longer range is available for the far detection range 11, where there is a narrower opening angle by focusing in order to be able to reliably scan objects further away. As is evident, the detection ranges 10, 11 have an overlap.

In the method according to the invention and thus also in the radar sensor 1, it is now provided to simultaneously scan both detection ranges 10, 11 while simultaneously emitting radio signals in a near frequency range and a far frequency range and correspondingly simultaneously receiving reflected radar signals and thus realize a near range operating mode and a far range operating mode. Received radar signals can be distinguished on the basis of the different frequency ranges and in the present case are each fed to a processing unit, e.g., a digital signal processor 9, of the processing device 8, where they are evaluated parallel in time, so that there is no time latency between the presence of the evaluation results for the near detection range 10 and the far detection range 11. The evaluation with respect to the distance takes place here in the detection range 11 with a coarser screening, for example a distance resolution of 30 cm, in comparison to the screening in the near detection range 10, where the distance resolution may be, for example, 15 cm, but in the fast Fourier transform (FFT) the same number of nodes is used. The different distance resolutions result from the fact that, in the present case, a frequency bandwidth of 500 MHz is used in the near frequency range, and in the far frequency range a frequency bandwidth of 250 MHz.

It should also be noted that in alternative embodiments it is also possible to evaluate the received radar signals of the near frequency range and the received radar signals of the far frequency range sequentially, for example if only one processing unit, e.g., a digital signal processor 9, is present.

While the radar signals for the near frequency range and the radar signals for the far frequency range are emitted in the same direction in the exemplary embodiment of FIG. 2, this is not necessarily required, in particular with differently oriented subantenna arrays 4, 5 through which the radar signals are emitted in different directions, as shown by way of example, the radar signals of the near frequency range laterally, so that the detection range 10' results, which does not overlap with the detection range 11 in this case.

In the case of overlapping detection ranges 10, 11 as shown in FIG. 2, evaluation results of the near frequency range and the far frequency range can also be further evaluated together, at least for the overlap range 12, for example with respect to mutual plausibility checking/object confirmation for determining object probabilities and/or during object tracking, in particular using Kalman filters, it being noted that the stability and reliability of tracking algorithms also accommodates the reduced latency.

FIG. 4 explains the timing of the processes in the radar sensor in more detail. The time blocks 13 are to be understood as emission and reception blocks, which in the present case each last 50 ms. By contrast, the blocks 14 are to be understood as evaluation blocks in which the evaluation of the last received radar signals takes place parallel to an emission and reception block 13, namely—like the emitting and receiving—parallel in time for the near frequency range and the far frequency range. If the arrows 15 symbolize the output of evaluation results, then every 50 ms, period 16, both evaluation results for the near frequency range, e.g., the detection range 10 and 10', and results for the far frequency range, that is, the detection range 11, are present.

FIG. 5 shows a first possible embodiment of the position of the frequency ranges 17, 18 in the frequency domain. In this embodiment, the far frequency range 17 at lower frequencies and the near frequency range 18 directly adjoin each other at higher frequencies. They thus seamlessly form an overall frequency range 19, which, with the bandwidths given above, has a frequency bandwidth of 750 MHz. In the context of the present invention, it may now be expedient, if even better distance resolutions are desired, to carry out a joint evaluation of the received radar signals of both frequency ranges 17, 18, e.g., with respect to the overall frequency range 19 with its increased frequency bandwidth. The performance of such an evaluation may be restricted to certain operating modes in which the ultra-near range is relevant. It should also be noted that further processing units of the processing device 8 can of course also be provided for such additional evaluation operations.

An alternative, preferred embodiment with separate frequency ranges 17, 18 is shown in FIG. 6. Here, the frequency ranges 17, 18 are separated by an output frequency range 20 of 250 MHz. If, in a common evaluation in the overall frequency range 19', which also includes the output frequency range 20, signal levels in the output frequency range 20 are set to zero or interpolated, a meaningful evaluation results with an increased frequency bandwidth of, in this case, 1 GHz of the overall frequency range 19' in comparison to the overall frequency range 19.

It should be noted at this point that, in principle, embodiments with overlapping frequency ranges 17, 18 or even a far frequency range 17 completely contained in the near frequency range 18 are conceivable.

FIG. 7 shows a schematic diagram of a motor vehicle 21 according to the invention in which two radar sensors 1 are installed in the present case, one directed towards the area ahead of the motor vehicle 21, one toward the rear space of the motor vehicle 21.

The invention claimed is:

1. A method for operating a radar sensor in a motor vehicle, wherein the radar sensor comprises an antenna arrangement configured to emit and receive radar signals and a processing device configured to evaluate the received radar signals, the method comprising:
   controlling the antenna arrangement to simultaneously emit and receive the radar signals both in a far frequency range and a near frequency range, wherein a bandwidth of the near frequency range is greater than a bandwidth of the far frequency range; and
   evaluating the received radar signals of the near frequency range as radar data of a higher distance resolution and the received radar signals of the far frequency range as radar data of a lower distance resolution,
   wherein a spatial detection range for the near frequency range partially overlaps a spatial detection range for the far frequency range,
   wherein the evaluating the received radar signals of the near and far frequency ranges comprises using same number of nodes in a fast Fourier transform, and
   wherein the evaluating the received radar signals further comprises evaluating received radar signals for an overall frequency range that is greater than the near frequency range and fully encompasses the near frequency range and the far frequency range and is continuous.

2. The method according to claim 1, wherein the bandwidth of the near frequency range is at least twice the bandwidth of the far frequency range.

3. The method according to claim 1, wherein an opening angle of the spatial detection range for the far frequency range is smaller than and is completely contained within an opening angle of the spatial detection range for the near frequency range, and wherein the far frequency range is completely encompassed by the near frequency range forming the overall frequency range.

4. The method according to claim 1, wherein the evaluating the received radar signals comprises setting to zero signal levels in an output frequency range between the near frequency range and the far frequency range.

5. The method according to claim 1, wherein the evaluating the received radar signals comprises applying an interpolation for signal levels in an output frequency range between the near frequency range and the far frequency range.

6. The method according to claim 1, wherein the radar signals of the near frequency range and the radar signals of the far frequency range are emitted in different directions.

7. The method according to claim 1, wherein the evaluating the received radar signals comprises evaluating the radar signals of the far frequency range and the radar signals of the near frequency range in a parallel time frame.

8. The method according to claim 7, wherein the evaluating the received radar signals comprises using the radar sensor having at least two processing units, each assigned to a frequency range of the processing device.

9. The method according to claim 1, wherein the controlling the antenna arrangement comprises controlling the antenna arrangement having a first subantenna arrangement for the near frequency range and a second subantenna arrangement for the far frequency range.

10. The method according to claim 1, wherein the controlling the antenna arrangement comprises controlling the antenna arrangement having at least one antenna formed as a horn antenna.

11. The method according to claim 1, further comprising:
using at least two transmission channels of the antenna arrangement, wherein different ones of the at least two transmission channels are used for emitting the radar signals of different frequency ranges.

12. The method according to claim 1, further comprising:
emitting the radar signals of the far frequency range at a transmission power that is greater than a transmission power for emitting the radar signals of the near frequency range.

13. The method according to claim 12, wherein the emitting the radar signals of the far frequency range comprises using a number of transmission channels greater than a number of transmission channels used for the radar signals of the near frequency range.

14. The method according to claim 12, wherein the emitting the radar signals of the far frequency range at the greater transmission power comprises emitting the radar signals of the far frequency range in a focused manner.

15. The method according to claim 14, wherein the emitting the radar signals of the far frequency range in the focused manner comprises using an assigned subantenna arrangement.

16. The method according to claim 1, further comprising:
assessing evaluation results of the near frequency range and the far frequency range in at least the partially overlapping spatial detection ranges to determine object probabilities or to track at least one detected object described by the evaluation results.

17. A radar sensor for a motor vehicle, the radar sensor comprising:
an antenna arrangement configured to emit and receive radar signals;
a processing device configured to evaluate received radar signals; and
a control device configured to:
control the antenna arrangement to simultaneously emit and receive the radar signals both in a far frequency range and a near frequency range, wherein a bandwidth of the near frequency range is greater than a bandwidth of the far frequency range; and
evaluate the received radar signals of the near frequency range as radar data of a higher distance resolution and the received radar signals of the far frequency range as radar data of a lower distance resolution,
wherein a spatial detection range for the near frequency range partially overlaps a spatial detection range for the far frequency range,
wherein the evaluating the received radar signals of the near and far frequency ranges comprises using same number of nodes in a fast Fourier transform, and
wherein the evaluating the received radar signals further comprises evaluating received radar signals for an overall frequency range that is greater than the near frequency range and fully encompasses the near frequency range and the far frequency range and is continuous.

18. A motor vehicle, comprising:
a radar sensor comprising:
an antenna arrangement configured to emit and receive radar signals;
a processing device configured to evaluate received radar signals; and
a control device configured to:
control the antenna arrangement to simultaneously emit and receive the radar signals both in a far frequency range and a near frequency range, wherein a bandwidth of the near frequency range is greater than a bandwidth of the far frequency range; and
evaluate the received radar signals of the near frequency range as radar data of a higher distance resolution and the received radar signals of the far frequency range as radar data of a lower distance resolution,
wherein a spatial detection range for the near frequency range partially overlaps a spatial detection range for the far frequency range,
wherein the evaluating the received radar signals of the near and far frequency ranges comprises using same number of nodes in a fast Fourier transform, and
wherein the evaluating the received radar signals further comprises evaluating received radar signals for an overall frequency range that is greater than the near frequency range and fully encompasses the near frequency range and the far frequency range and is continuous.

* * * * *